United States Patent [19]

Gaske

[11] 3,914,165

[45] Oct. 21, 1975

[54] RADIATION CURABLE NON-GELLED MICHAEL ADDITION REACTION PRODUCTS

[75] Inventor: Joseph E. Gaske, Mount Prospect, Ill.

[73] Assignee: DeSoto, Inc., Des Plaines, Ill.

[22] Filed: Jan. 7, 1974

[21] Appl. No.: 431,441

Related U.S. Application Data

[62] Division of Ser. No. 290,068, Sept. 18, 1972, Pat. No. 3,844,916.

[52] U.S. Cl. . 204/159.15; 204/159.14; 204/159.18; 204/159.23; 260/89.5 R; 260/482 R; 260/837 R; 427/54
[51] Int. Cl.$^2$ .................. C08F 2/50; C08F 120/20; C08L 63/02; C08L 63/10
[58] Field of Search ....... 260/836, 837; 204/159.15, 204/159.23

[56] References Cited

UNITED STATES PATENTS

| | | | |
|---|---|---|---|
| 3,450,613 | 6/1969 | Steinberg | 204/159.15 |
| 3,756,984 | 9/1973 | Klaren et al. | 260/836 |
| 3,759,807 | 9/1973 | Osborn et al. | 204/159.23 |
| 3,823,107 | 7/1974 | Cotton | 260/837 |

*Primary Examiner*—Murray Tillman
*Assistant Examiner*—Thurman K. Page
*Attorney, Agent, or Firm*—Dressler, Goldsmith, Clement & Gordon, Ltd.

[57] ABSTRACT

Radiation curable, non-gelled Michael addition reaction products are obtained by reacting an amine containing at least one amino hydrogen atom with a stoichiometric excess of ethylenic material comprising a polyacrylate. These reaction products contain unreacted acrylate groups, and the radiation cure is not inhibited by oxygen.

9 Claims, No Drawings

RADIATION CURABLE NON-GELLED MICHAEL ADDITION REACTION PRODUCTS

This is a division, of Application Ser. No. 290,068, filed Sep. 18, 1972, and now U.S. Pat No. 3,844,916.

The present invention relates to radiation curable coating compositions, and certain tertiary amine compounds upon which the same are based, it being intended to avoid the oxygen inhibition which normally characterizes said compositions. It is particularly intended to enable rapid cure of 100% solids systems with ultraviolet light using a minimum of energy while minimizing or eliminating effluent fumes or vapors. As a feature of the invention, inks are provided which cure at high speed using ultraviolet radiation and which are easily degraded in dilute aqueous caustic solution to permit recycling of the printed paper which is produced.

In accordance with this invention, an amine containing at least one amino hydrogen atom is adducted with a stoichiometric excess of ethylenic material comprising a polyacrylate using a Michael addition to form an adduct containing unreacted acrylate groups and at least one tertiary beta amino group resulting from the addition. The polyacrylate produces a tertiary beta amino group having the structure:

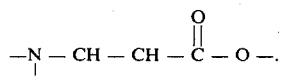

It has been found that these Michael addition products are rapidly polymerized or copolymerized through vinyl polymerization under the influence of ionizing radiation. In the presence of appropriate photosensitizers, which are, per se, well known, they cure rapidly to form solid films under ultraviolet radiation. The point of importance is that the radiation polymerization of ethylenic materials is extended and speeded when the unsaturated tertiary beta amines of this invention are present and, when ultraviolet radiation is used, the tertiary beta amine content of the adduct appears to scavenge oxygen preventing air inhibition of coating compositions, which is unusual and of obvious importance.

As will later more fully appear, this invention includes Michael addition products of relatively high as well as low molecular weight, those addition products which are non-liquid being preferably rendered liquid by being dissolved in ethylenically unsaturated liquids such as hydroxy ethyl acrylate or styrene.

Also, the proportion of the amine-containing Michael addition product in the total composition which is radiated is subject to wide variation. The greater the proportion of amine, the faster the radiation cure and the more rapidly is the cured product degraded by exposure to dilute aqueous caustic. With a small proportion of amine, as little as about 0.5% by weight being adequate, coatings which are very durable can be obtained using an extended radiation cure. With more amine, the radiation cure is very rapid, enabling use in high speed lithography, and, when the amine content is high enough, the cured print is easily deinked with a conventional cuastic deinking solution as employed in paper reclamation. The organic by-products of the deinking process have the potential of being readily biodegradable.

It is desired to point out that the Michael addition reaction is a known reaction; however, the use of this addition reaction with the materials of this invention, and using normal laboratory or industrial production practices, results in compounds which gel during, or shortly after, preparation. I have discovered that these reaction products are very sensitive to sunlight or ordinary white flourescent room lighting. The tendency toward gelation and storage instability which may lead one away from the systems under consideration are avoided in this invention by proceeding in the dark or, at least, in the absence of ultraviolet light radiation. This is accomplished by using ultraviolet filtered flourescent lights and plastic ultraviolet filters on windows to limit sunlight.

In a simplified form, this invention is illustrated by the reaction of 1 mol of diethyl amine with 1 mol of pentaerythritol triacrylate to produce the fluid adduct 2,3-di-acryloxy,4-beta N,N,diethyl propionoxy neopentyl alcohol.

The Michael addition reaction is simply conducted because it is an exothermic reaction which takes place in the liquid phase at moderate temperature in the absence of catalyst. Thus, the diethyl amine is simply added incrementally to the triacrylate with agitation under reflux and the temperature is limited to 70°C. by adjustment of the rate of addition and with a cold water bath heat exchanger. When the reaction is over, the exotherm ceases and the temperature lowers. Benzophenone photosensitizer is conveniently added (3% by weight) when the reaction product has cooled to about 54°C. at which temperature it melts and immediately dissolves. The reaction can be carried out in the dark or using light which has been passed through an ultraviolet filter. Commercial pentaerythritol triacrylate containing 200 p.p.m. of the methyl ether of hydroquinone can be used.

The product is a viscous clear liquid stable at room temperature in the dark or in filtered flourescent light. It is particularly useful as a paper coating, and in inks which cure rapidly under ultraviolet exposure and the cured products de-ink easily in 3% aqueous caustic.

It will be observed that the unsaturation is in excess on an equivalent basis so that, in the final product, the amino hydrogen atoms are substantially completely consumed by the Michael addition reaction and there is excess unreacted ethylenic unsaturation enabling subsequent polymerization or copolymerization of the tertiary amine adduct by ionizing radiation, and more particularly by ultraviolet light.

It should also be noted that it is best that the Michael addition reaction be substantially complete, though this is not essential since the unsaturation in the unreacted polyacrylate can still copolymerize with the unsaturation in the reacted polyacrylate. Nonetheless, reproducibility suggests complete reaction and this is easily obtained when the reaction temperature is permitted to exceed about 48°C.

The proportion of amine which may be used will vary considerably depending upon the circumstances and the intended utility.

From the standpoint of proportions in the Michael addition reaction, at least about 0.5% of the materials reacted together should be constituted by the amine, but larger amounts are preferably used (at least 1%) to enhance resistance to air inhibition during an ultraviolet cure. The maximum proportion of amine in the Michael addition reaction is determined by the need for a stoichiometric excess of ethylenic material comprising polyacrylate. This provides unreacted acrylate groups in the product which insures that the amine component is non-volatile and chemically incorporated by polymerization into the radiation cured product.

More amine can be tolerated when the amine is monofunctional, as is found in secondary amines such as diethyl amine, but more amine leads to faster cure and easier caustic degradation so that larger proportions of amine, e.g., at least 5%, and more preferably 10–35%, will be used in paper coatings and inks to render the paper recyclable. Less amine can be tolerated when the amine contains more than two amino hydrogen atoms, e.g., triethylene tetramine. Here, from 2 to 25% of amine is appropriate, preferably 3–10%. Similarly, polyamines of higher molecular weight are used in lesser proportions.

Amines, as a class, and especially aliphatic amines are known to participate in the Michael addition reaction and, accordingly, any amine capable of undergoing the Michael addition reaction is broadly suitable for use in this invention. Monofunctional amines, e.g., secondary amines which contain a single amino hydrogen atom, have previously been illustrated by the use of diethyl amine, but any amine containing a single amino hydrogen atom may be used in this invention, these being further illustrated by dibutyl amine, dioctyl amine, di (hydrogenated-coco) amine and diallylamine. Hydroxy functional amines are also useful, such as diethanol amine though it has been found that these are less preferred since they form adducts which are somewhat less stable than other amines. It is stressed, however, that perfect storage stability is not a requirement of this invention, and this is especially true of systems in which the radiation cure is supplemented by an N-methylol cure as will later be illustrated.

Amines containing a plurality of amino hydrogen atoms are also quite useful in this invention. Referring again to the reaction of diethyl amine with pentaerythritol triacrylate, it will be understood that the replacement of a proportion of the diethylamine with another amine containing a plurality of amino hydrogen atoms leads to the production of higher molecular weight products and provides, in this fashion, a mechanism for controlling the viscosity of the product which is produced. Thus, a small proportion of ethyl amine can be used to replace the diethyl amine in the illustration previously presented, and this leads to Michael addition products of higher molecular weight and higher viscosity.

Aromatic amines which can be used are illustrated by 4,4'-diaminodiphenyl methane and diaminodiphenyl ether.

Of course, the amine containing a plurality of amino hydrogen atoms need not be used in admixture with monofunctional amines. Thus, neopentyl glycol diacrylate can be reacted with ethyl amine or butyl amine, this reaction of two difunctional reactants leading to the production of polymers which have higher molecular weight as the stoichiometric excess of diacrylate is reduced.

It will be observed that the Michael addition products produced by this invention are frequently hydroxy functional and such hydroxy functionality can be utilized as the basis for a supplemental cure. Such supplemental cure has numerous advantages, but it will be immediately evident that the radiation cured products of this invention are attacked by aqueous caustic, the degree of attack being broadly proportional to the number of beta amino groups which are introduced. If a proportion of aminoplast resin is utilized in combination with hydroxy functional Michael addition products of this invention, then polymers formed by ultraviolet light radiation can be further cross-linked by the application of heat causing the N-methylol group of an aminoplast resin to condense with the hydroxy group in the Michael addition products of this invention, thereby causing the products of this invention to become more resistant to heat and solvent, physically harder and tougher, and more resistant to chemical attack.

It is stressed that one important feature of this invention is the opportunity to achieve a rapid cure without employing elevated temperatures, e.g., by using ultraviolet radiation alone. However, this advantage can be sacrificed when a supplemental cure is desired.

Some of the Michael addition products produced by this invention are liquid at room temperature. This is illustrated by the reaction product of diethyl amine with pentaerythritol triacrylate which has been illustrated hereinbefore. The liquid form is obviously helpful in enabling the reaction products to be utilized, but these reaction products need not be liquid at room temperature and the invention includes solid products which can be applied by melting the same using heat to assist application, or the products can be dissolved in an appropriate solvent and used in organic solvent solution.

It is particularly stressed that while the invention broadly includes the selection of inert as well as reactive solvents, ethylenically unsaturated solvents are particularly contemplated, and especially those which include the acrylate group which is especially responsive to ultraviolet radiation.

As previously indicated, the conventional radiation cure is air inhibited, making it difficult to rely upon this cure in coating technology. It has also been stressed that the use of the Michael addition product of this invention overcomes the air inhibition which has been so troublesome to the art. It is here emphasized that the unsaturated Michael addition products of this invention will not only cure by themselves, but the presence of these products in admixture with other ethylenic materials will confer radiation cure capacity and resistance to air inhibition to the mixture. To illustrate this, one can react 1 mol of neopentyl glycol diacrylate with 1 mol of diethyl amine in the manner illustrated previously, thereby obtaining a 92% yield of Michael addition product. This product, sensitized with 3% by weight of benzophenone and applied as a thin film on paper, cures rapidly on ultraviolet exposure, and the cure of the film is not air inhibited. If the neopentyl glycol diacrylate had not been reacted with the diethyl amine, then its ultraviolet cure with 3% benzophenone would be air inhibited. A mixture of 80 parts of neopentyl glycol diacrylate with 20 parts of the neopentyl glycol diacrylate-diethyl amine Michael addition product photosensitized with 3% by weight of benzophenone cures rapidly on ultraviolet exposure, and the mixture is not air inhibited. Apparently, the presence of the minor proportion of Michael addition product serves to appropriately divert atmospheric oxygen, preventing it from interfering with the ultraviolet polymerization of the unmodified diacrylate.

The invention has been illustrated to this point by the use of simple amines, such as monoamines, which may be primary or secondary amines. Tertiary amines are not available for use in this invention because, lacking amino hydrogen, they do not participate in the Michael addition reaction, and, therefore, cannot be adducted with polyacrylates. However, polyamines are just as useful as are monoamines. If one wishes to build a highly branched structure, then it is appropriate to employ amines having as high a functionality as possible. Such polyamines are illustrated by diethylene triamine, triethylene tetramine, and tetraethylene pentamine. These include terminal primary amino groups and secondary amine groups spaced along the length of the chain. It will be understood that the presence of amine groups along the length of the chain is not required as is illustrated by the usefulness of hexamethylene diamine which contains only terminal amine groups. On the other hand, polyamides having terminal amino groups are also quite useful as illustrated by the commercial material Versamid 125 which is an amine-terminated fatty polyamide. These various amines can be used alone or in any desired combination, but it will be understood that when these higher functional amines, and especially those of higher molecular weight, are reacted with a stoichiometric excess of polyacrylate, that the products are frequently solid and, therefore, difficult to use. Also, if the polyacrylate is used alone, then the high functionality of the polyacrylate in combination with the high functionality of the amine can lead directly to the production of insoluble gelled products and these are not desired in this invention. Accordingly, the polyacrylate can be used in admixture with liquid monoacrylates or in admixture with other liquid monoethylenic monomer, such as styrene, vinyl toluene, acrylonitrile, diacetone acrylamide, etc., to either minimize the cross-link density obtained directly by the Michael addition reaction, or as a solvent to dissolve the normally solid Michael addition product, or for both purposes in combination. Indeed, and when amines containing a plurality of amino hydrogen atoms are used, and particularly when there are three or more amino hydrogen atoms per molecule of the amine, then it is normal to utilize polyacrylates and monoacrylates or other liquid monomer in admixture with one another, the monoacrylate or other monoethylenic monomer serving to prevent gelation during the Michael addition reaction, and to provide a solvent action to insure the liquidity of the product. The monoethylenic monomer can be reacted with the amine first, or together with the polyacrylate. When the Michael addition product is photosensitized and irradiated, all of the ethylenic materials present participate in radiation induced polymerization regardless of whether they are part of the Michael addition product or not, the beta amino structure in the Michael addition product enhancing the radiation cure and providing resistance to air inhibition on ultraviolet radiation to an extent which is generally proportional to the amount of amine which is present in the final composition.

The unsaturated amines of this invention copolymerize and this extends the radiation cure and also functions to remove the amines by copolymerization which insures that they will not leach out of the polymers which are formed.

While this invention prefers to provide a system which is relatively stable in the absence of ultraviolet radiation and which is directly and rapidly cured to its final form by ultraviolet radiation, the ultraviolet radiation can be utilized to stabilize in solid form a system which is finally cured in some other fashion, especially by the aminoplast cure referred to hereinbefore. this is illustrated using the conventional epoxy diacrylates such as those produced by reacting two mols of acrylic acid with 1 mol of a relatively low molecular weight diglycidyl ether of bisphenol, such as bisphenol A. Epoxy diacrylates of this type having an average molecular weight of about 550 are available and, as will be understood, such products will possess an hydroxy functionality of between two and three hydroxy groups per molecule. These epoxy diacrylates can be photosensitized and cured by ultraviolet exposure, but the cure is oxygen inhibited. In this invention, reaction of the epoxy diacrylate with 0.9% by weight of diethyl amine will serve to render the epoxy diacrylate resistant to air inhibition, the product remaining radiation curable because only a minor proportion of the acrylate groups present have entered into a Michael addition reaction with the small proportion of diethyl amine employed. This Michael addition reaction product can be combined with an aminoplast resin and a proportion of hydroxy ethyl acrylate utilized to provide a liquid product, e.g., 10% by weight of hexamethoxy methyl melamine can be utilized to provide a conventional N-methylol curing capacity with the hydroxy groups of the epoxy acrylate.

The resulting liquid can be used to coat metal and the coatings can be hardened and rendered non tacky by ultraviolet exposure. However, the coating includes relatively low molecular weight hydroxy functional resin and aminoplast resin, so the coating can be further cured by the application of heat as is customary in metal coating operations to form a hard, adherent, flexible and chemically resistant film with little or no fumes being emitted during the processing.

To further illustrate the polyacrylates which are used in this invention, there may be used polyesters of acrylic acid with polyhydric alcohols such as ethylene glycol, propylene glycol, butylene glycol, diethylene glycol, trimethylol propane, glycerine, pentaerythritol, sorbitol, and the like. The esterification may be complete, but incomplete etherification is preferred in some instances to provide polyesters which contain residual hydroxy functionality.

It is particularly convenient in some instances, as noted hereinbefore, to react an epoxy resin with acrylic acid in a stoichiometric amount based on epoxy functionality. Polyglycidyl ethers of bisphenols are particularly contemplated. These contain some hydroxy groups prior to reaction, and the reaction with acrylic acid generates further hydroxy functionality.

Photosensitizers useful for rendering a composition sensitive to ultraviolet radiation are well known, and the selection of any particular agent within this class is not a feature of this invention. Indeed, the use of photosensitizers is largely limited to the desirability of using ultraviolet radiation and this invention is not limited to this particular form of ionizing radiation. A number of known photosensitizers have been successfully tested, namely, benzophenone, acetophenone, benzoin (and methyl, butyl or isobutyl ethers of benzoin) are all effective at 0.5–3% weight concentrations. 10-thioxanthenone is effective at lower concentrations (in the order of 0.1–0.3% by weight). Optimum concentrations seem to be a function of the particular composition in which the particular photosensitizer is used, coupled with the thickness of film being converted, the intensity of the ultraviolet energy source, and the time of exposure.

It will be observed that the unsaturated tertiary amine adducts of this invention not only lead to ultraviolet light-induced polymerizations which are non-air inhibited, but they also greatly extend the range of ethylenic materials which will respond to ultraviolet light-induced polymerization. For example, trimethylol propane triacrylate photosensitized with 3% by weight of benzophenone does not respond to ultraviolet light cure, but the addition of the unsaturated tertiary amine adducts of this invention results in rapid ultraviolet light cures. Similarly, acrylonitrile photosensitized in the same manner does not respond to ultraviolet light, but the addition of the unsaturated tertiary amine adducts of this invention results in rapid ultraviolet light cures.

In carrying out the present invention, a 550 watt (2 inch) medium pressure Hanovia Corp., mercury are quartz lamp in an appropriate polished aluminum reflecter is suitable for stationary tests. A 5 kilowatt Hanovia (24 inch) mercury arc quartz lamp focused into an approximately ½ inch band of light using a parabolic polished aluminum reflector is suitable for dynamic testing. The latter is mounted over a variable speed conveyor fitted wtih a 12 inch wide belt to enable as little as 1/12th of a second light exposure at maximum speed. This lamp can be used at half power yielding the equivalent of 1/24th of a second light radiation exposure time. Both units are further shielded to prevent light radiation leakage into the work area and properly vented with air exhaust ducts. From the standpoint of ultraviolet filtered light which can be used to illuminate the work area, it has been found that yellow flourescent tubes such as Sylvania Life Line F 40 G O are appropriate.

The invention is further illustrated in the following examples.

EXAMPLE I 1 mole - Pentaerythritol triacrylate
1 mole - Diethylamine

The diethylamine is incrementally added to the diacrylate under reflux conditions with constant stirring. The heat of this Michael addition reaction is limited to a maximum of 70°C by moderating the rate of amine addition and by the use of an external water bath. When the reaction is complete the temperature begins to decrease.

EXAMPLE II

The procedure of Example I is repeated using one mole of trimethylol propane triacrylate instead of the pentaerythritol triacrylate used in Example I.

EXAMPLE III

In a 250 ml pyrex beaker on a laboratory hot plate mix together,
39.0g - di(hydrogenated-coco) amine (see note 1)
29.8g - Pentaerythritol triacrylate At 50°C the mixture clears and a rapid exotherm to 55°C is noted. Continue heating and mixing to 80°C, add:
20.0g - Isodecyl acrylate Stir and add:
1.2g - Benzophenone
Allow to cool to room temperature.

EXAMPLE IV

The liquid product of Example I is used to prepare samples by dissolving (with heating where necessary) 3.0% (by wt.)

Note 1

Armour Ind. Chem. Co. product "Armeen 2C" can be used of benzophenone, benzoin, benzoin methyl ether, benzoin butyl ether, benzoin iso-butyl ether, or acetophenone. Another sample was prepared using 0.2% (by wt.) of 10-thioxanthenone. All of these samples were applied separately onto a thin clay coated highly calandered paper with a No. 6 wire wound rod using a glass plate as a base. All were observed to convert to a highly glossy tack free film within 5 seconds at 30 cm. from the 550 watt arc in air atmosphere, or at about 1/12 second (180 ft.min.$^{-1}$) under the 5 kilowatt arc. The experiments were repeated on glass and on metal plates with identical results. All films were mar resistant, insoluble in methyl ethyl ketone or in water using a "finger rub test". The sample with benzophenone was tested at 180 ft.min.$^{-1}$ using ½ power (2.5 kilowatt) input to the 5 kilowatt arc and found to convert with no obvious difference in final physical properties.

Tests on brown kraft paper also produced converted films in air.

EXAMPLE V

The procedure described in Example IV was repeated using the liquid product of Example II with 3.0% (by wt.) benzophenone. The final film was identical to that observed in Example IV but was noted to be more flexible on folding and crushing the coated paper, no cracking was evident.

EXAMPLE VI

The liquid product prepared in Example III was cast onto paper in the manner described in Example IV and converted at 30 ft.min.$^{-1}$ under the 5 kilowatt arc and found to convert to a waxy feeling, tack-free, highly glossy film resistant to water and methyl ethyl ketone. This film is very flexible.

EXAMPLE VII 36.5gm (0.5gm mol) - Butylamine
50.0gm (0.5gm mol) - Ethyl acrylate Mix together in a pint glass jar open to air. Temperature peaks at 66°C in 7 minutes. Allow to cool to 50°C and add:
142gms (0.5gm mol) - Trimethylol propane triacrylate Mix, temperature peaks at 40°C in 7 minutes dropping to 46°C in 15 minutes. Add:
6.0g - Benzophenone This material converts in the same manner as observed in Example IV using 180 ft.min.$^{-1}$ conveyor speed and half power input to the 5 kilowatt arc lamp.

EXAMPLE VIII 7.11g - Acrylamide
7.31g - n-butyl amine

In a 100 ml pyrex glass beaker, warm on hot plate to 48°C. Remove from heat. Temperature continues to increase to 67°C where it remains for 5–10 minutes and then decreases. At 25°C this is a syrupy fluid. Add:

28.4g - Trimethylol propane triacrylate

Exothermic reaction proceeds, temperature increases from 25°C to 65°C. When reaction is complete and temperature decreases to 50°C. Add:

1.28g - Benzophenone

Mix to dissolve. Allow to cool to room temperature.

This material is applied onto paper and onto an aluminum panel with a No. 6 wire wound rod and exposed to the 5 kilowatt Hanovia lamp at 180 ft.min.$^{-1}$ (1/12th second exposure). The films formed are tack-free, glossy, mar resistant, flexible, and insoluble in methyl ethyl ketone using the finger rub test of about 30 seconds duration.

EXAMPLE IX 5.51g - Acrylonitrile
7.31g - N-butyl amine

Mix together in a 100 ml pyrex glass beaker. The temperature increases from 23°C to 56°C in several minutes where it remains for about 5 minutes and then begins to decrease. At 40°C add:

28.4g - Trimethylol propane triacrylate

Mix. The temperature is observed to drop to 35°C and then rise rapidly to 53°C. This is then heated on a hot plate to 70°C., then allowed to cool to 55°C and add:

1.24g - Benzophenone

Cool to room temperature (23°C)

This material is applied onto an aluminum panel and onto paper with a No. 6 wire wound rod and exposed to the 5 kilowatt Hanovia lamp for 1/12 second. Both films are tack-free, glossy, mar resistant, flexible and insoluble in methyl ethyl ketone using the finger rub test of about 30 seconds duration.

EXAMPLE X 100.0g - bisphenol A-epichlorohydrin epoxy resin diacrylate (molecular weight = about 550)
0.9g - diethyl amine.

Mix in a glass beaker and after 5 minutes add:

3.0g - Benzophenone

Warm to 30°C and mix to dissolve benzophenone and stir in:

10.9g - hexamethoxy methyl melamine (Cymel 301 (American Cyanamid Corp.) can be used, if desired, The resulting fluid, after overnight storage in a dark cabinet, has a No. 4 Ford Cup viscosity at 25°C of 55 seconds. This fluid was applied to a 0.0135 inch thick aluminum alloy panel which had been detergent washed, and exposed to the 5 kilowatt Hanovia lamp conveyorized unit at 60 ft.min.$^{-1}$ belt speed. A gelled, very slightly tacky film forms which can readily be removed with the finger nail and which had poor methyl ethyl ketone resistance. Heating this for 1 minute at 450°F in an air oven followed by rapid quenching in cold water results in a film which has a 3H pencil hardness, much improved methyl ethyl ketone resistance, is strongly adherent (passes the cross hatched "Scotch" brand cellophane tape adhesion test), and passes reverse impact testing with a ⅝ inch diameter tester to 80 inch pounds.

EXAMPLE XI

The liquid of Example I was used with 3% (wt.) benzophenone to disperse colored pigments. Dispersion was made using a glass mortar and pestal followed by mulling with a glass muller on a glass plate.

Yellow ink 50.0gm — Lead Chromate "Primrose Yellow"
40.0gm — photosensitized Example I fluid

Black ink 3.0gms — Hydrite 10 clay
1.0gms — Lampblack
10.0gms — photosensitized Example I fluid

Blue ink 28.6gms — microfine marble dust (Calcium Carbonate)
3.3gms — Phthalocyanine Blue
68.1gms — photosensitized Example I fluid

Gold bronze metallic ink 1.0gm — MD-650-B Pale Gold Powder (Alcan Metal Limited)
8.0gms — photosensitized Example I fluid The metallic ink was prepared in each instance by simple stirring. All the inks were applied to paper by the use of a No. 6 wire wound rod draw down or a hand brayer. All the inks converted with ease in the presence of air upon 1/12 second exposure to the 5 kilowatt arc except the metallic ink which required an exposure of equal duration on the back side of the paper as well as on the front side. The yellow ink converted at ½ power input to the arc. Satisfactory conversion of the inks is viewed as the ability of the converted inks to resist transference of color by rubbing with a piece of uncoated white paper. None of these converted inks would "off-set" onto uncoated white paper immediately after being photoconverted with extreme thumb pressure applied. Also, all the inks could be immediately recoated with each other, or with the clear photosensitized Example I liquid, and converted in 1/12 to 1/24th of a second ultraviolet exposure. There was no visible bleed-through of color and in all cases intercoat adhesion was excellent. Further, all of the converted ink surfaces have a glossy tack free surface.

Five square inches of paper coated with these compositions were cut into ¼ inch squares and placed in a 1 inch diameter × 2¾ inch tall screw cap vials. 10cc of 3% aqueous sodium hydroxide was added. The vials were not shaken but allowed to stand undisturbed at room temperature. Within 30 minutes the coatings had disintegrated and the paper was observed to be white with no coating on it. The fluid around the paper was colored (where color is involved). No remnant of coating could be observed with 3 power optical magnification. The fluid is slightly gellatinous in nature. This was not so with the Gold metallic ink only. This film had parted from the paper but was intact as a curled metallic colored sheet. With slight shaking this broke down into very fine suspended metallic particles.

The criterion for selection of pigment of dyestuff has been found to be very fine particle size with extreme dispersion needed, light must be able to be transmitted or an inert light transparent fine particle (such as clay or calcium carbonate) must be used in conjunction with the opaque pigment such as carbon black, the colored component must not be reactive with the fluid Michael addition adduct or monomers used, and the colored component must not be itself photoactive, consuming ultraviolet light energy and thereby retarding the desired photoconversion.

EXAMPLE XII

A mixture of 1/1 by weight of acrylonitrile and the Michael adduct of Example I (to which 3% (wt) benzophenone had been added). The resultant composition has a very low viscosity. It was applied to an aluminum panel using a No. 6 wire wound rod and exposed to the 5 kilowatt ultraviolet arc lamp unit at 60 ft.min.$^{-1}$ in air. A tack free, hard, glossy, mar resistant, and methyl ethyl ketone resistant film results.

EXAMPLE XIII

The colored inks (of Example XI) were applied as very thin films onto a white "Nylon Taffita" (88 thread/inch, style No. 306A, Test Fabrics, Inc.). This was photocured under the 5 kilowatt Hanovia arc lamp in air at 100 ft.min.$^{-1}$. The inks were found to be tenaciously adherent to the fabric and visually unchanged after four warm water laundry detergent test washings and dryings.

The invention is defined in the claims which follow.

I claim:

1. An ultraviolet radiation curable, non-gelled tertiary amine Michael addition reaction product of an aliphatic amine containing a single amino hydrogen atom selected from dibutyl amine and diethyl amine with a stoichiometric excess of a polyacrylate, said reaction product containing at least one unreacted acrylate group and at least one beta amino group providing resistance to oxygen inhibition of said ultraviolet radiation cure, said amine constituting at least 0.5% of the reaction product and the amino hydrogen atoms of said amine being substantially consumed in said reaction product.

2. An addition reaction product as recited in claim 1 in which said polyacrylate is an hydroxy functional polyester with acrylic acid containing at least two acrylate groups per molecule.

3. An addition reaction product as recited in claim 1 in which said polyacrylate is a polyester of acrylic acid with an epoxy resin.

4. An addition reaction product as recited in claim 3 in which said epoxy resin is a diglycidyl ether of a bisphenol.

5. An addition reaction product as recited in claim 1 in which said product is liquid at room temperature.

6. An addition reaction product as recited in claim 1 in which said product is in solution in ethylenically unsaturated liquid.

7. An addition reaction product as recited in claim 1, in which said amine is diethyl amine.

8. An addition reaction product as recited in claim 1 in which said polyacrylate is a polyester of acrylic acid with a polyhydric alcohol.

9. An addition reaction product as recited in claim 1 in which said amine is used in an amount of at least 5%.

* * * * *

Disclaimer 3,914,165.—*Joseph E. Gaske*, Mount Prospect, Ill. RADIATION CURABLE NON-GELLED MICHAEL ADDITION REACTION PRODUCTS. Patent dated Oct. 21, 1975. Disclaimer filed May 18, 1976, by the assignee, *DeSoto, Inc.*

Hereby enters this disclaimer to claims 1–6, 8 and 9 of said patent.

[*Official Gazette July 20, 1976.*]